United States Patent
Hong

(10) Patent No.: US 8,068,668 B2
(45) Date of Patent: Nov. 29, 2011

(54) DEVICE AND METHOD FOR ESTIMATING IF AN IMAGE IS BLURRED

(75) Inventor: Li Hong, San Diego, CA (US)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/527,675

(22) PCT Filed: Jul. 17, 2008

(86) PCT No.: PCT/US2008/070290

§ 371 (c)(1),
(2), (4) Date: Aug. 18, 2009

(87) PCT Pub. No.: WO2009/012364

PCT Pub. Date: Jan. 22, 2009

(65) Prior Publication Data

US 2010/0086206 A1    Apr. 8, 2010

(51) Int. Cl.
*G06K 9/00* (2006.01)
(52) U.S. Cl. ......... 382/168; 382/100; 382/254; 382/276
(58) Field of Classification Search ............... 382/100, 382/168, 276
See application file for complete search history.

(56) References Cited

U.S. PATENT DOCUMENTS

| | | | |
|---|---|---|---|
| 6,556,720 B1 * | 4/2003 | Avinash | 382/260 |
| 6,711,293 B1 | 3/2004 | Lowe | |
| 6,728,416 B1 | 4/2004 | Gallagher | |
| 6,832,009 B1 | 12/2004 | Shezaf et al. | |
| 7,020,343 B1 | 3/2006 | Avinash | |
| 7,359,540 B2 * | 4/2008 | Avinash | 382/131 |
| 7,362,354 B2 * | 4/2008 | Lin | 348/222.1 |
| 7,551,776 B2 * | 6/2009 | Jeffrey et al. | 382/168 |
| 7,693,304 B2 * | 4/2010 | Obrador | 382/112 |
| 7,697,754 B2 * | 4/2010 | Park et al. | 382/168 |
| 2002/0039199 A1 | 4/2002 | Nose et al. | |
| 2002/0110282 A1 | 8/2002 | Kraft et al. | |
| 2002/0159648 A1 | 10/2002 | Alderson et al. | |
| 2003/0161549 A1 * | 8/2003 | Lei et al. | 382/274 |
| 2004/0258305 A1 | 12/2004 | Burnham et al. | |
| 2005/0249429 A1 | 11/2005 | Kitamura | |
| 2006/0078164 A1 | 4/2006 | Lin | |
| 2006/0177145 A1 | 8/2006 | Lee | |
| 2008/0025627 A1 | 1/2008 | Freeman et al. | |
| 2008/0175508 A1 | 7/2008 | Bando et al. | |

OTHER PUBLICATIONS

Simoncelli, "Statistical Modeling of Photographic Images" Handbook of Image and Video Processing, Ch. 4, 2005.*
Search Report and Written Opinion for PCT/US2008/070290 (related to the present application), Nov. 8, 2008, Nikon Corporation.

(Continued)

*Primary Examiner* — Stephen Koziol
(74) *Attorney, Agent, or Firm* — Roeder & Broder LLP

(57) ABSTRACT

A method for estimating if an image (14) is either blurred or sharp includes the steps of (i) determining an image gradient histogram distribution (410) of at least a portion of the image (14), and (ii) comparing at least a portion of the image gradient histogram distribution (410) to a Gaussian model gradient histogram distribution (414) of at least a portion of the image (14) to estimate if the image (14) is either blurred or sharp. In most cases, a sharp image (14) has a relatively large tailed distribution when compared to the Gaussian model, while a blurred image has a relatively small tailed distribution when compared to the Gaussian model.

28 Claims, 11 Drawing Sheets

OTHER PUBLICATIONS

F. Crete, T. Dolmoere, P. Ladret, M. Nicolas, "The blur effect: perception and estimation with a new non-reference perceptual blur metric", 2007, in proceedings of Human Vision and Electronic Imaging XII, vol. 6492, SPIE 2007.

Pina Marziliano, Frederic Dufaux, Stefan Winkler, Touradj Ebrahimi, "Perpetual Blur and Ringing Metrics: Application to JPEG2000," Jun. 30, 2003, preprint submitted to Elsevier Science, Genista Corp., 4-23-8 Ebisu, Shibuya-ku, Tokyo 150-0013, Japan.

David J. Field, "What is the goal of sensory coding?" Neural Computation 6, 1994, pp. 559-610, ©1994 Massachusetts Institute of Technology.

Rob Fergus, B. Singh, A. Hertzmann, S. Roweis, W. Freeman, "Removing camera shake from a single photograph", 2006 Siggraph.

* cited by examiner

DEVICE AND METHOD FOR ESTIMATING IF AN IMAGE IS BLURRED

BACKGROUND

Cameras are commonly used to capture an image of a scene that includes one or more objects. Unfortunately, some of the images are blurred. For example, movement of the camera and/or movement of the objects in the scene during the exposure time of the camera can cause the image to be blurred. Further, an out of focus image is also blurred.

Currently, there are some methods that are used to determine if the image is blurred. Unfortunately, many of these methods associate blur degree with edge spreading in the image. As a result thereof, their performance is very sensitive to the accuracy of edge detection techniques. For a sharp and low noise image, the current edge detection techniques can achieve good results. However, this performance degrades drastically for noisy images.

SUMMARY

The present invention is directed to a method for estimating if an image is either blurred or sharp. In one embodiment, the method includes the steps of (i) determining an image gradient histogram distribution of at least a portion of the image, and (ii) comparing at least a portion of the image gradient histogram distribution to a Gaussian model gradient histogram distribution of at least a portion of the image to estimate if the image is either blurred or sharp. As an overview, in most cases, a sharp image has a relatively high number of large gradients when compared to the Gaussian model, while a blurred image has a relatively small number of large gradients when compared to the Gaussian model. Thus, the new estimating method is based on the image gradient histogram distribution for the particular image being evaluated. This method can be less sensitive to noise.

In one embodiment, the image is divided into a plurality of image regions and an image gradient histogram distribution of at least one of the image regions is determined. Further, in this embodiment, the image gradient histogram distributions for at least one of the image regions is compared to a Gaussian model for that image region to estimate if the image is either blurred or sharp.

In certain embodiments, a tail section of the Gaussian model is compared to a tail section of the image gradient histogram distribution to estimate if the image is either blurred or sharp.

Additionally, the present method can include the step of evaluating the image to estimate if there is motion blur in the image. Further, the method can include the step of evaluating at least a portion of the image to determine if the contrast is correct. For example, an intensity domain histogram curve of the image can be generated to determine if the contrast of the image is correct. Moreover, the contrast can be adjusted (e.g. by linear mapping to a higher contrast) for at least a portion of the image if the contrast is determined to be below the predetermined threshold.

In yet another embodiment, the method includes the steps of: (i) blurring the image to create an artificially blurred image; (ii) determining an image gradient histogram distribution for at least a portion of the image; (iii) determining an image gradient histogram distribution for at least a portion of the artificially blurred image; and (iv) comparing at least a portion of the image gradient histogram distribution of the image to at least a portion of the image gradient histogram distribution for the artificially blurred image to compute a distribution probability difference to estimate if the image is either blurred or sharp.

In still another embodiment, the present invention is directed to a device for estimating if an image is either blurred or sharp. The device can include a control system that (i) determines an image gradient histogram distribution of at least a portion of the image; and (ii) compares at least a portion of the image gradient histogram distribution to a Gaussian model to estimate if the image is either blurred or sharp. In certain embodiments, the image gradient histogram is compared to the Gaussian model. The Gaussian model is a standard function, with few parameters that can be adjusted. For example, the Gaussian model can be adjusted according to each image (or image block) gradient histogram characteristics.

In yet another embodiment, the present invention is directed to a method and device for deconvoluting an image that is estimated to be blurred.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 10 illustrates another embodiment of a system having features of the present invention.

DESCRIPTION

Figure 1:
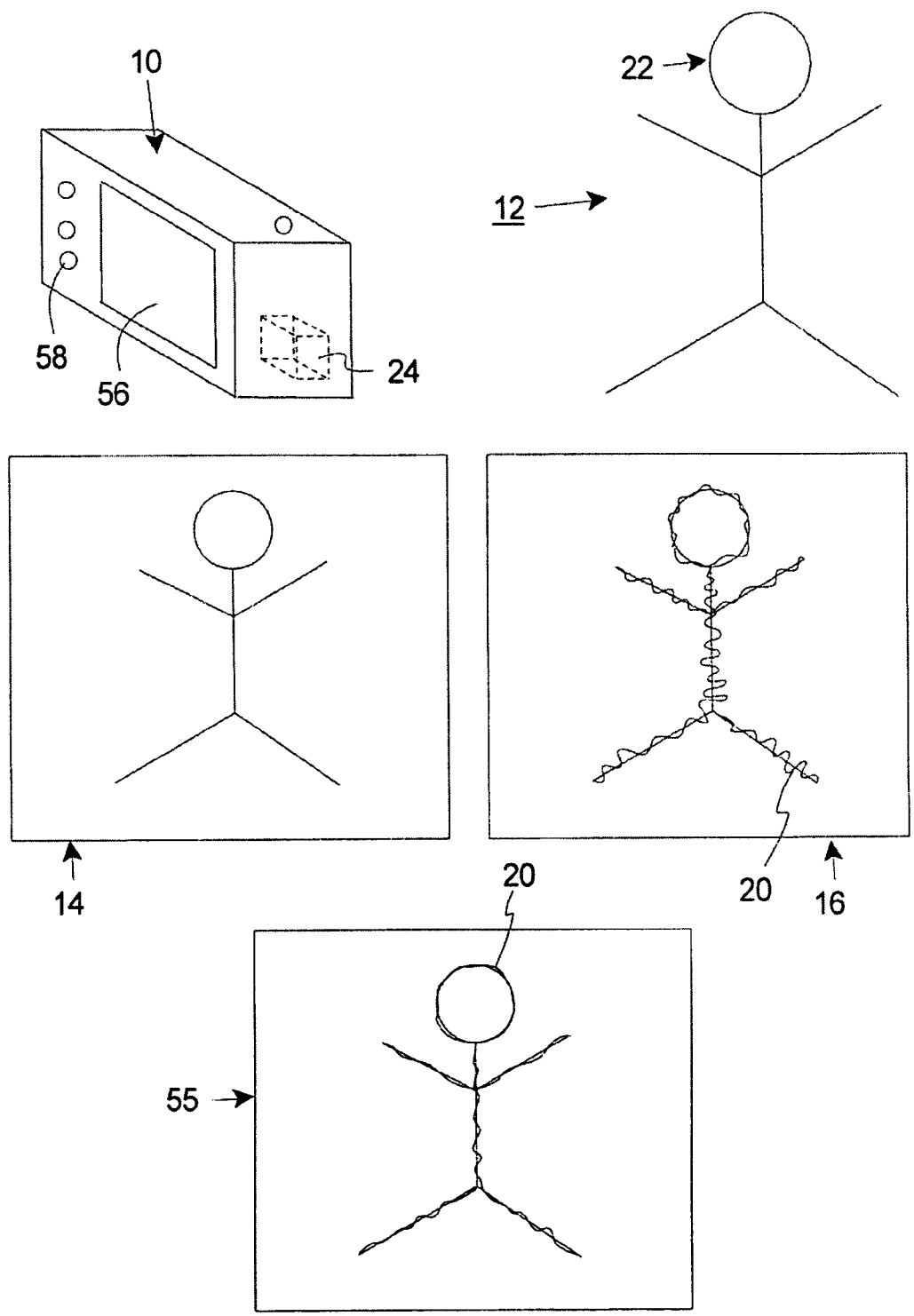
FIG. 1 is a simplified view of a scene, an image apparatus having features of the present invention, a raw, first captured image of the scene, a raw, second captured image of the scene, and an adjusted image.

FIG. 1 is a simplified perspective illustration of an image apparatus 10 having features of the present invention, and a scene 12. FIG. 1 also illustrates a raw first captured image 14 (illustrated away from the image apparatus 10), and a raw second captured image 16 (illustrated away from the image apparatus 10) captured by the image apparatus 10. In FIG. 1, the first captured image 14 is a sharp image and the second captured image 16 is blurred 20 (illustrated as a wavy line). For example, movement of the image apparatus 10, and/or movement of an object 22 in the scene 12 during the capturing of the blurred image 16 can cause motion blur 20 in the image 14. Alternatively or additionally, blur 20 in the image 16 can be caused by the image apparatus 10 not being properly focused when the image 14 is captured.

In one embodiment, the image apparatus 10 includes a control system 24 (illustrated in phantom) that uses a unique method for estimating if one or more of the captured images 14, 16 are blurred. Stated in another fashion, the present invention provides a device and method for accurately quantifying the amount of blur 20 in the images 14, 16. As a result thereof, a given image 14, 16 can be checked to determine if that image 14, 16 is blurred or sharp. Subsequently, a deblurring process can be applied to only the images 16 that are determined to be blurred. Thus, a sharp image 14 will not be subjected to the deblurring process.

The type of scene 12 captured by the image apparatus 10 can vary. For example, the scene 12 can include one or more objects 22, e.g. animals, plants, mammals, and/or environments. For simplicity, in FIG. 1, the scene 12 is illustrated as including one object 22. Alternatively, the scene 12 can include more than one object 22. In FIG. 1, the object 22 is a simplified stick figure of a person.

Figure 2:
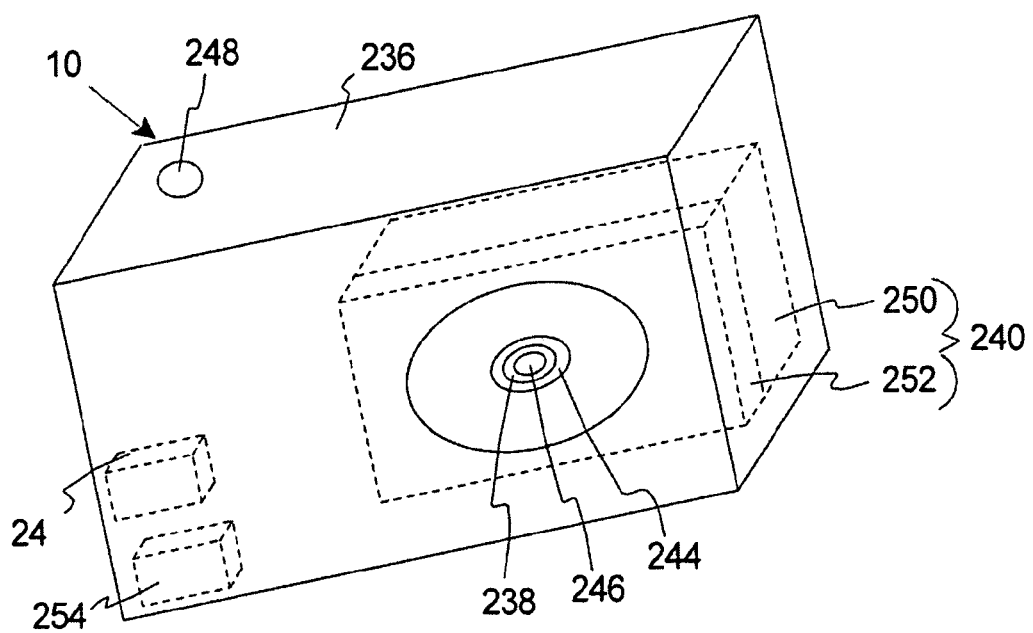
FIG. 2 is a simplified front perspective view of the image apparatus of FIG. 1.

FIG. 2 illustrates a simplified, front perspective view of one, non-exclusive embodiment of the image apparatus 10. In this embodiment, the image apparatus 10 is a digital camera, and includes an apparatus frame 236, an optical assembly 238, and a capturing system 240 (illustrated as a box in phantom), in addition to the control system 24 (illustrated as a box in phantom). The design of these components can be varied to suit the design requirements and type of image apparatus 10. Further, the image apparatus 10 could be designed without one or more of these components. Additionally or alternatively, the image apparatus 10 can be designed to capture a video of the scene 12.

The apparatus frame 236 can be rigid and support at least some of the other components of the image apparatus 10. In one embodiment, the apparatus frame 236 includes a generally rectangular shaped hollow body that forms a cavity that receives and retains at least some of the other components of the camera.

The apparatus frame 236 can include an aperture 244 and a shutter mechanism 246 that work together to control the amount of light that reaches the capturing system 240. The shutter mechanism 246 can be activated by a shutter button 248. The shutter mechanism 246 can include a pair of blinds (sometimes referred to as "blades") that work in conjunction with each other to allow the light to be focused on the capturing system 240 for a certain amount of time. Alternatively, for example, the shutter mechanism 246 can be all electronic and contain no moving parts. For example, an electronic capturing system 240 can have a capture time controlled electronically to emulate the functionality of the blinds.

The optical assembly 238 can include a single lens or a combination of lenses that work in conjunction with each other to focus light onto the capturing system 240. In one embodiment, the image apparatus 10 includes an autofocus assembly (not shown) including one or more lens movers that move one or more lenses of the optical assembly 238 in or out until the sharpest possible image of the subject is received by the capturing system 240.

The capturing system 240 captures information for the images 14, 16 (illustrated in FIG. 1). The design of the capturing system 240 can vary according to the type of image apparatus 10. For a digital type camera, the capturing system 240 includes an image sensor 250 (illustrated in phantom), a filter assembly 252 (illustrated in phantom), and a storage system 254 (illustrated in phantom).

The image sensor 250 receives the light that passes through the aperture 244 and converts the light into electricity. One non-exclusive example of an image sensor 250 for digital cameras is known as a charge coupled device ("CCD"). An alternative image sensor 250 that may be employed in digital cameras uses complementary metal oxide semiconductor ("CMOS") technology.

The image sensor 250, by itself, produces a grayscale image as it only keeps track of the total quantity of the light that strikes the surface of the image sensor 250. Accordingly, in order to produce a full color image, the filter assembly 252 is generally used to capture the colors of the image.

The storage system 254 stores the various images before these images are ultimately printed out, deleted, transferred or downloaded to an auxiliary storage system or a printer. The storage system 254 can be fixedly or removable coupled to the apparatus frame 236. Non-exclusive examples of suitable storage systems 254 include flash memory, a floppy disk, a hard disk, or a writeable CD or DVD.

The control system 24 is electrically connected to and controls the operation of the electrical components of the image apparatus 10. The control system 24 can include one or more processors and circuits, and the control system 24 can be programmed to perform one or more of the functions described herein. In FIG. 2, the control system 24 is secured to the apparatus frame 236 and the rest of the components of the image apparatus 10. Further, the control system 24 is positioned within the apparatus frame 236.

Referring back to FIG. 1, in certain embodiments, the control system 24 includes software that estimates if a given image 14, 16 is sharp or blurred. Further, the control system 24 can include software that reduces the amount of blur 20 in a blurred image 16 to provide an adjusted image 55. In this example, the control system 24 determines that the first image 14 is sharp and that no further processing is necessary. Further, the control system 24 determines that the second image 16 is blurred. Subsequently, the control system 24 reduces the blur in the second image 16 to provide the adjusted image 55.

The image apparatus 10 can include an image display 56 that displays the raw images 14, 16 and/or the adjusted image 55. With this design, the user can decide which images 14, 16, 55 should be stored and which images 14, 16, 55 should be deleted. In FIG. 1, the image display 56 is fixedly mounted to the rest of the image apparatus 10. Alternatively, the image display 56 can be secured with a hinge mounting system (not shown) that enables the display 56 to be pivoted. One non-exclusive example of an image display 56 includes an LCD screen.

Further, the image display 56 can display other information that can be used to control the functions of the image apparatus 10.

Moreover, the image apparatus 10 can include one or more control switches 58 electrically connected to the control system 24 that allows the user to control the functions of the image apparatus 10. For example, one or more of the control switches 58 can be used to selectively switch the image apparatus 10 to the blur evaluation and reduction processes disclosed herein.

Figure 3:
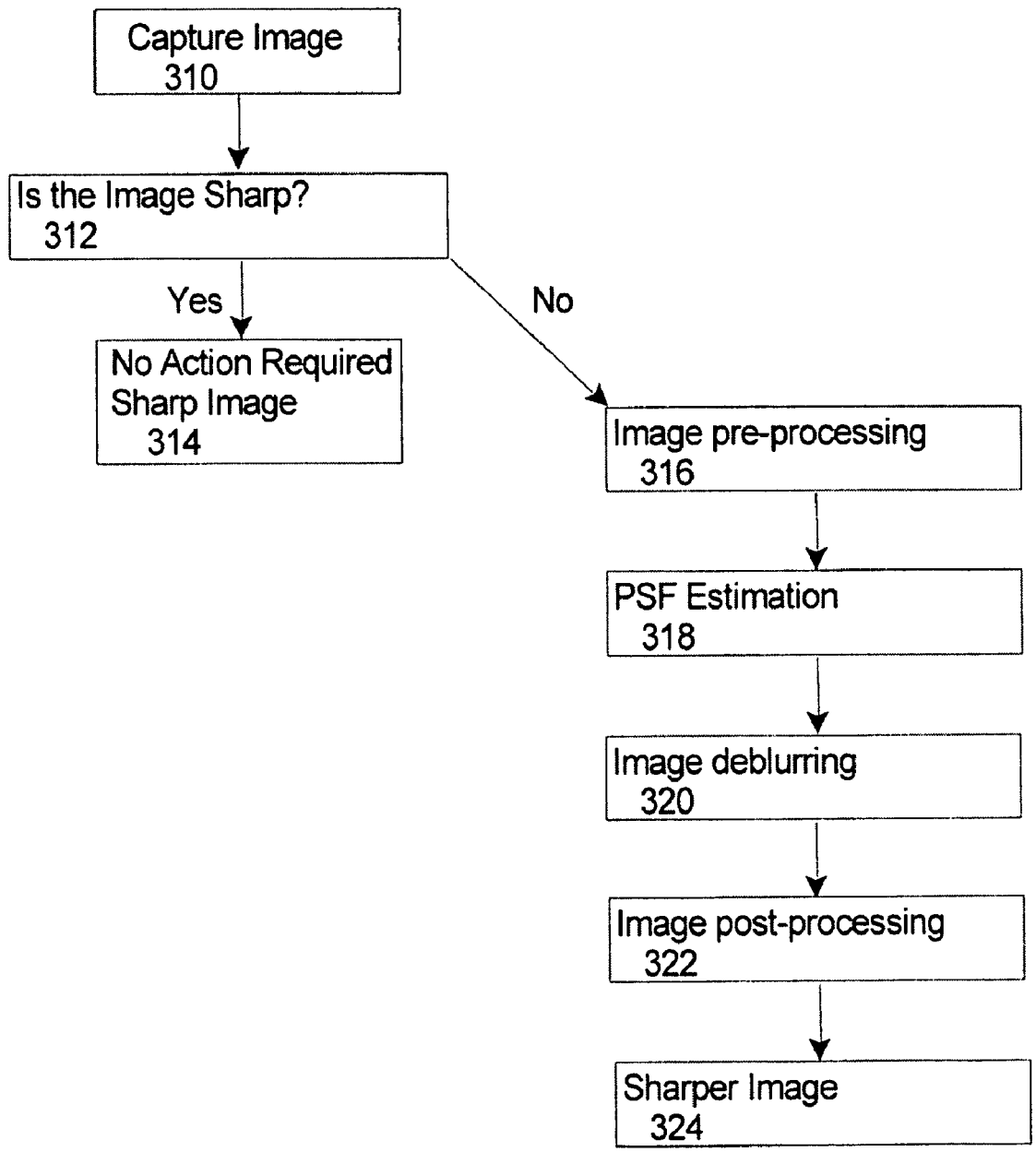
FIG. 3 is a flow chart that illustrates one embodiment of an image processing procedure having features of the present invention.

FIG. 3 is a flow chart that illustrates one embodiment of an image processing procedure having features of the present invention. First, the image is captured at step 310. Next, the image is evaluated to classify if the image is sharp at step 312. This step is discussed in more detail below. If the image is sharp, processing of that image is complete 314. Alternatively, if the image is determined to be blurred, pre-processing of the image begins at step 316. Next, a Point Spread Function ("PSF") is estimated for the image at step 318. Subsequently, the image is deblurred using the PSF at step 320. Next, the image is post-processed at step 322. Finally, the adjusted, sharper image is generated at step 324.

The process used to evaluate an image to classify the image as sharp or blurred can be varied pursuant to the teachings provided herein. As an overview, in one embodiment, the present invention relies on the concept that sharp natural images have a heavy tailed gradient distribution.

Figure 4A:
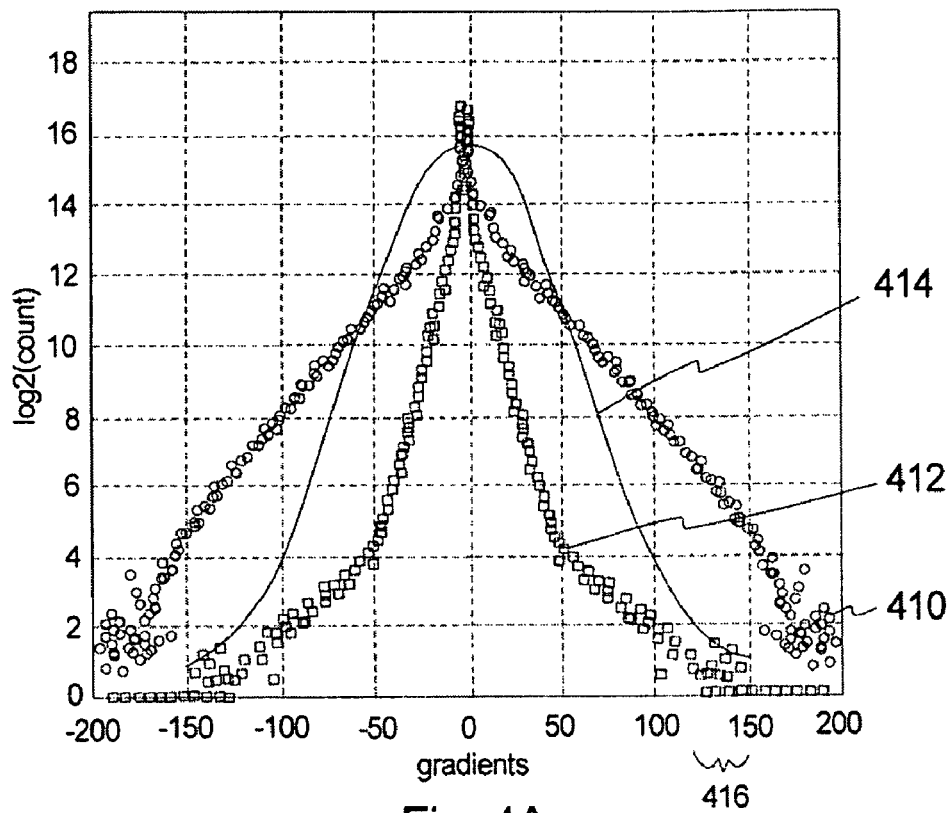
FIG. 4A is a graph that illustrates an image gradient histogram distribution for the first image, an image gradient histogram distribution for the second image, and a Gaussian model.

FIG. 4A is a graph that illustrates a first image gradient histogram distribution 410 (illustrated as a plurality of circles) for the sharp first image 14 (illustrated in FIG. 1), a second image gradient histogram distribution 412 (illustrated as a plurality of squares) for the blurred second image 16 (illustrated in FIG. 1), and a gradient histogram distribution 414 for a Gaussian model (illustrated as a line). As illustrated in FIG. 4A, the gradient value can be positive or negative.

Figure 4B:
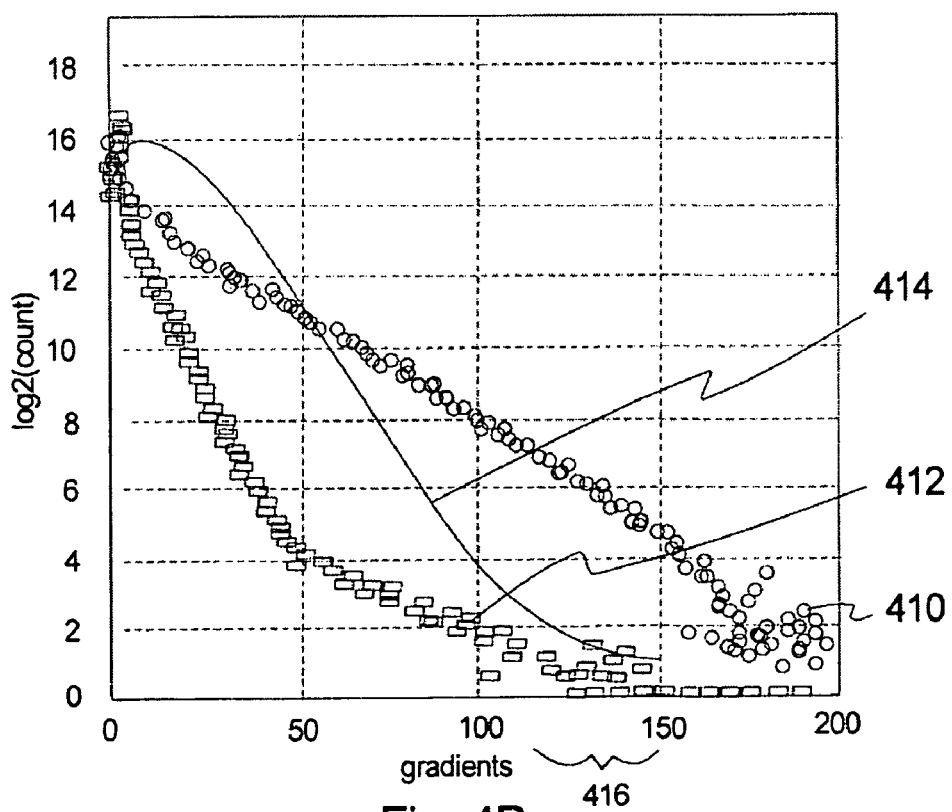
FIG. 4B is a graph that illustrates a histogram distribution of the absolute image gradient for the first image, a histogram distribution of the absolute image gradient for the second image, and an absolute value for a Gaussian model.

Somewhat similarly, FIG. 4B is a graph that illustrates a histogram distribution of the absolute image gradient of the first image gradient histogram distribution 410 (illustrated as a plurality of circles) for the sharp first image 14 (illustrated in FIG. 1), a histogram distribution of the absolute image gradient for the second image gradient histogram distribution 412 (illustrated as a plurality of squares) for the blurred second image 16 (illustrated in FIG. 1), and a histogram distribution of the absolute image gradient for a Gaussian model 414 (illustrated as a line). To generate FIG. 4B, the histograms of the absolute values of the image gradients are utilized. In certain embodiments, the term image gradient histogram refers to this histogram distribution of the absolute image gradients.

In FIGS. 4A and 4B, the vertical axis represents the count value (e.g. the number of pixels with a specific gradient value), while the horizontal axis represents the gradient value. Thus, the higher the count value vertically represents a higher number of pixels that have that gradient value. In FIG. 4A, the gradient value increases moving left and right from zero, while in FIG. 4B, the gradient value increases moving left to right.

For each image 14, 16 the respective image gradient histogram distribution 410, 412 represents how much difference exists between each pixel and its neighboring pixels in the respective image. The difference can be measured along the X axis, along the Y axis, diagonally, or along some other axis. Further, the difference can be the intensity difference, or possibly some other difference.

For example, for the first image 14, the value for the first image gradient histogram distribution 410 can represent how much difference in intensity exists between adjacent pixels along the X axis. This example can be represented as following equation:

$$Gx = G(i,j) - G(i+1,j)$$

where $G(i,j)$ represents the intensity of a pixel located at i, j; and $G(i+1, j)$ represents the intensity of a pixel located at i+1, j.

Alternatively, for the first image 14, the value for the first image gradient histogram distribution 410 can represent how much difference in intensity exists between adjacent pixels along the Y axis. This example can be represented as following equation:

$$Gy = G(i,j) - G(i,j+1)$$

where $G(i,j)$ represents the intensity of a pixel located at i, j; and $G(i, j+1)$ represents the intensity of a pixel located at i, j+1.

The second image gradient histogram distribution 412 can be calculated in a similar fashion.

It should be noted that the respective image gradient histogram distribution 410, 412 and the Gaussian model gradient histogram distribution 414 can be calculated for the entire respective image 14, 16. Alternatively, the respective image gradient histogram distribution 410, 412 and the Gaussian model gradient histogram distribution 414 can be calculated for one or more selected regions of the respective image 14, 16. This example is discussed in more detail below.

The Gaussian model is an adaptive reference model that is based on the image gradient histogram curve. In one embodiment, the Gaussian model is computed from a standard Gaussian function with variation 2.5 and window size of 150. The scale of the Gaussian model is computed as the ratio of the sum of the image gradient histogram to the sum of the standard Gaussian function. In certain embodiments, the Gaussian model window width is within approximately 120-180 gradients. Typically, the higher the peak distribution value, the smaller the Gaussian window width. Further, the higher the number of large image gradients, the bigger the Gaussian window width.

Stated in another fashion, the reference Gaussian model can be adjusted based on the image gradient characteristics. In general, the Gaussian model window size is approximately 150, with the large gradient cutoff of approximately 100-150. The Gaussian model scale is ratio from the area of the gradient curve to the area of the Gaussian model. In certain embodiments, the model is adaptively adjusted based on the image gradient histogram characteristics. In one embodiment, the basic adjusting rule includes (i) increasing or decreasing the window size based on the amount of high gradients present in the image, (ii) adjusting the cut-off window size based on the adjusted Gaussian window, and (iii) constraining the Gaussian model scale in certain range (not too low and not too high).

Referring to the image gradient histogram distribution 410, sharp images 14 obey heavy-tailed distribution in their gradient domain (e.g. have a relatively high number of large gradients). The distribution of gradients has a large probability on small gradients (approximately −50 to 50 gradients) and small probability on large gradients (approximately −150 to −200 gradients and 150 to 200 gradients), but it shows significantly more probability to large gradients than the Gaussian distribution 414.

Comparing each image gradient histogram distribution 410, 412 with its respective Gaussian model 414 illustrates that the first image gradient histogram distribution 410 for a sharp image 14 has significantly more probability to large gradients than the Gaussian model 414, while the second gradient histogram distribution 412 for blurry image 16 has significantly less probability for large gradients than the Gaussian model 414. Thus, in certain embodiments, the present invention relies on the determination that a sharp image 14 will have significantly more probability to large gradients than the Gaussian model 414.

Stated in another fashion, sharp images 14 have a heavy-tailed distribution in their image gradient histogram distribution 410. Thus, sharp image gradient histogram distributions 410 show significantly more probability to large gradients than the Gaussian model 414. In this embodiment, the present invention defines the estimating measure as the difference of large gradients distribution probability between a given image and the Gaussian model. With the present invention, the estimating measure will show larger positive value for a focused image and a relatively small positive or a negative value for defocused image.

As provided herein, the present invention can focus on a tail section 416 of the gradient distributions to determine if an image is in focus. As used herein the term "tail section" 416 shall refer to the last portion of the Gaussian model 414, e.g. the last 10-20 percent of the Gaussian model 414 in one embodiment. Because the Gaussian model will vary according to the scene, the exact value for the tail section will vary according to the scene that is being captured.

Referring to FIGS. 4A and 4B, in this example, the Gaussian model 414 has a maximum gradient value of approximately 150. In this example, the Gaussian tail section 416 can have a gradient value of greater than approximately 120 and above (e.g. last 20% of Gaussian model gradient histogram distribution).

In this embodiment, reviewing the tail section 416 area in FIGS. 4A and 4B, only the first image gradient histogram distribution 410 has higher counts in the tail section 416 than the Gaussian model 414. Further, the second image gradient histogram distribution 412 has a much fewer gradients than the Gaussian model in the tail section 416. Thus, only the first image 14 is in focus, while the second image 16 is not in focus.

It should be noted that the present method can assign a blur metric to each image based on the difference between the respective image gradient histogram distribution 410, 412 and the Gaussian model 414. The term blur metric is also sometimes referred to herein as blur degree. In certain embodiments, only the count differences in the tail section 416 are considered when assigning the blur metric value. Alternatively, the count differences outside the tail section 416 can also be considered when calculating the blur metric.

In one non-exclusive embodiment, the blur metric can be equal to the normalized sum of the differences in the gradient histogram distributions. It can be normalized via the sum of the tail section of the reference Gaussian model.

In one embodiment, if the value of the blur metric for an image or a portion thereof is above a predetermined threshold blur value, that image is classified as a sharp image. Alternatively, if the value of the blur metric for an image or a portion thereof is below the predetermined threshold blur value, that image is classified as a blurred image. As non exclusive examples, the predetermined threshold blur value can be 0.9, 0.8, or 0.7.

Figure 5A:
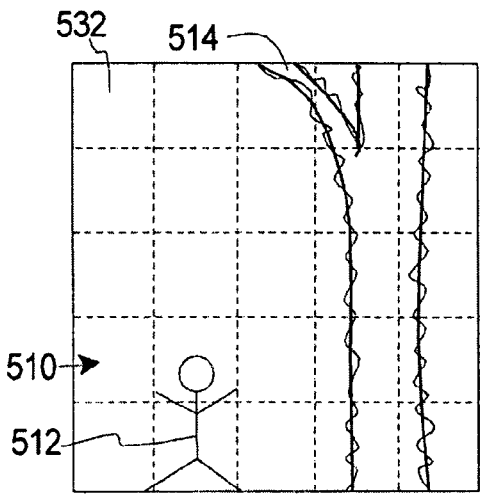
FIG. 5A is a simplified illustration of another captured image.
Figure 5B:
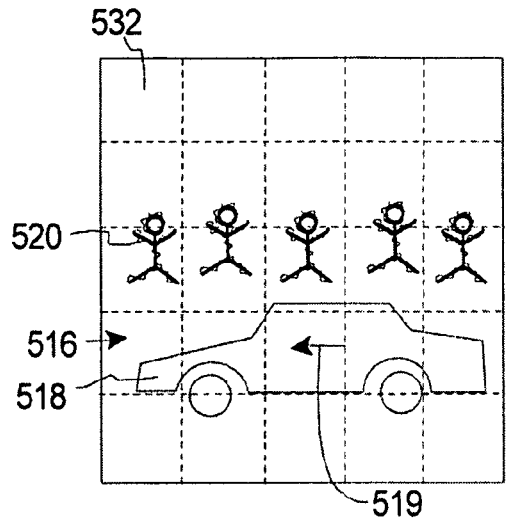
FIG. 5B is a simplified illustration of yet another captured image.

FIGS. 5A and 5B are simplified illustrations of alternative captured images that can be analyzed utilizing the processes disclosed herein. More specifically, FIG. 5A is a simplified image 510 of a person 512 (illustrated as a stick figure) and a portion of a tree 514. In this embodiment, the person 512 is in focus, while the tree 514 (illustrated with wavy lines to depict blur) is in the background and is not in focus. Further, FIG. 5B is a simplified image 516 of a moving car 518 (as indicated by arrow labeled 519) with a plurality of stationary people 520 (illustrated as stick figures) behind the car 518. In the FIG. 5B embodiment, the image apparatus (not shown) was moved in the same direction as the car 518 while capturing this image 516 so that the moving car 518 is in focus while the stationary people 520 (illustrated with wavy lines to depict blur) are blurred.

In these examples, the desired features of the images 510, 516 are properly focused. More specifically, the person 512 in image 510 is in focus and the car 518 in image 516 is in focus. Unfortunately, in some instances, if the respective image gradient histogram distribution and the Gaussian model are calculated and compared for the entire image, these images can be determined to be blurred.

Figure 5C:
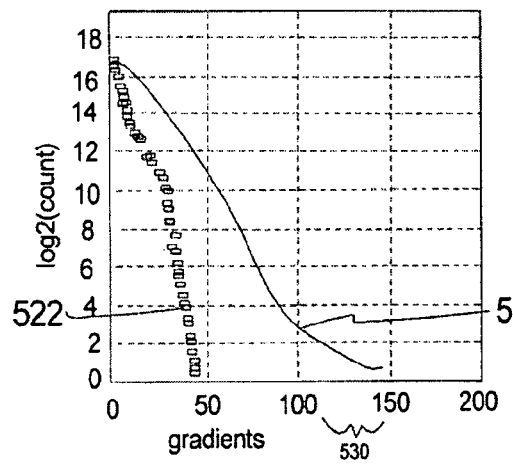
FIG. 5C is a graph that illustrates a histogram distribution of the absolute image gradient for the captured image of FIG. 5A, and an absolute value for a Gaussian model for the captured image of FIG. 5A.
Figure 5D:
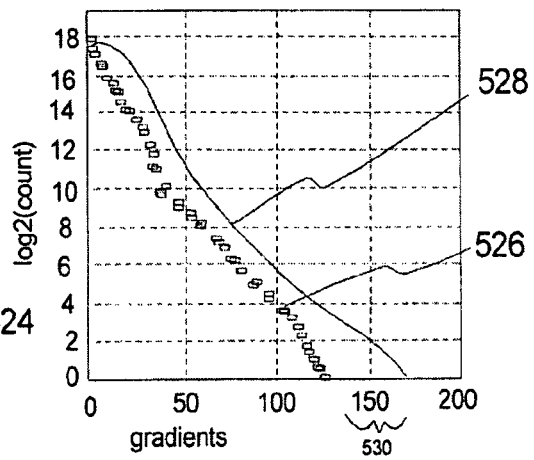
FIG. 5D is a graph that illustrates a histogram distribution of the absolute image gradient for the captured image of FIG. 5B, and an absolute value for a Gaussian model for the captured image of FIG. 5B.

More specifically, FIG. 5C is a graph that illustrates a histogram distribution of the absolute image gradient 522 for the entire captured image 510 of FIG. 5A, and an absolute value for a Gaussian model 524. Somewhat similarly, FIG. 5D is a graph that illustrates a histogram distribution of the absolute image gradient for the entire captured image 516 of FIG. 5B, and an absolute value for a Gaussian model 528. In this example, reviewing the tail section 530 in FIGS. 5C and 5D, neither of the images gradient histogram distributions 522, 526 is greater than its respective Gaussian Model 524, 528. Thus, both images 510, 516 would be found to be out of focus.

Referring back to FIGS. 5A and 5B, in certain embodiments, the present method can partition and divide the respective image 510, 516 into a plurality of equally sized, regions 532 (illustrated with dashed lines), and an image gradient histogram distribution and a Gaussian model can be calculated for each of the regions 532. In this embodiment, each image is partitioned into a plurality of regions 532 and a blur metric is computed separately for each of the plurality of regions 532. In these Figures, twenty-five separate regions 532 are illustrated for reference. Moreover, each of the regions 532 are illustrated in these Figures as being square. It should be noted that the image can be partitioned into more than or fewer than twenty-five regions 532 and/or the regions 532 can have a shape other than square. Further, the maximum value of blur metric can be chosen as the blur metric for the whole image.

Figure 5E:
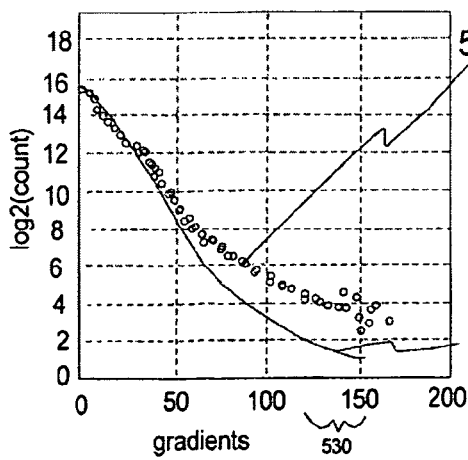
FIG. 5E is a graph that illustrates a histogram distribution of the absolute image gradient for one region of the captured image of FIG. 5A, and an absolute value for a Gaussian model for that region.
Figure 5F:
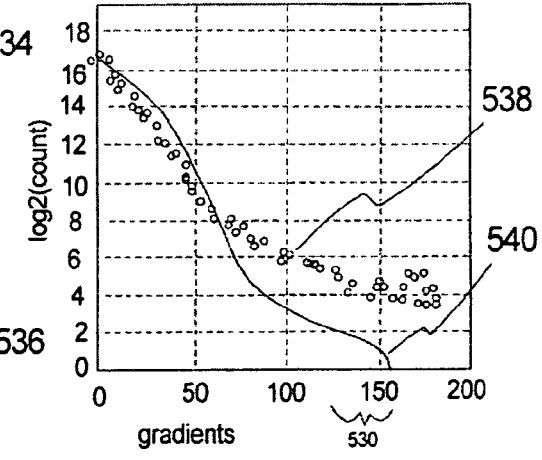
FIG. 5F is a graph that illustrates an absolute value for the image gradient histogram distribution for one region of the captured image of FIG. 5B, and an absolute value for a Gaussian model for that region.

FIG. 5E is a graph that illustrates a histogram distribution of the absolute image gradient 534 for one region 532 (having the largest blur metric value) of the captured image of FIG. 5A, and a histogram distribution of the absolute image gradient 536 for a Gaussian model of that region 532. Somewhat similarly, FIG. 5F is a graph that illustrates a histogram distribution of the absolute image gradient 538 for one region 532 (having the largest blur metric value) of the captured image 516 of FIG. 5B, and a histogram distribution of the absolute image gradient for a Gaussian model 540 of that region 532. In this example, reviewing the tail section 530 in FIGS. 5E and 5F, both of the images gradient histogram distributions 534, 538 are greater than its respective Gaussian Model 536, 540. Thus, both images 510, 516 would be found to be in focus because at least one of the regions 532 in the respective image 510, 516 is in focus.

The number, size and shape of the regions 532 can be varied according to the resolution of the images 510, 516. In non-exclusive examples, the regions 532 can be approximately 512 by 512 pixel blocks, or 256 by 256 pixel blocks.

Further, it should be noted that the regions 532 can have another shape other than square. Moreover, the blur metric may only be calculated for centrally located regions.

In one embodiment, the region 532 size is based on the input image resolution. Basically, the total partitioned region 532 number is relatively constant for different resolution. Therefore, for a high resolution input image, the block size is larger than the one with small resolution. In general, the size of the region 532 is approximately 512 by 512.

For an image with low depth of field, e.g. macro, close-up, a relatively a small region 532 size (e.g. 128, 256) can be selected.

Additionally, one or more of the regions 532 can be further divided into sub-regions and a separate blur metric value can be selected for each sub-block.

Figure 5G:
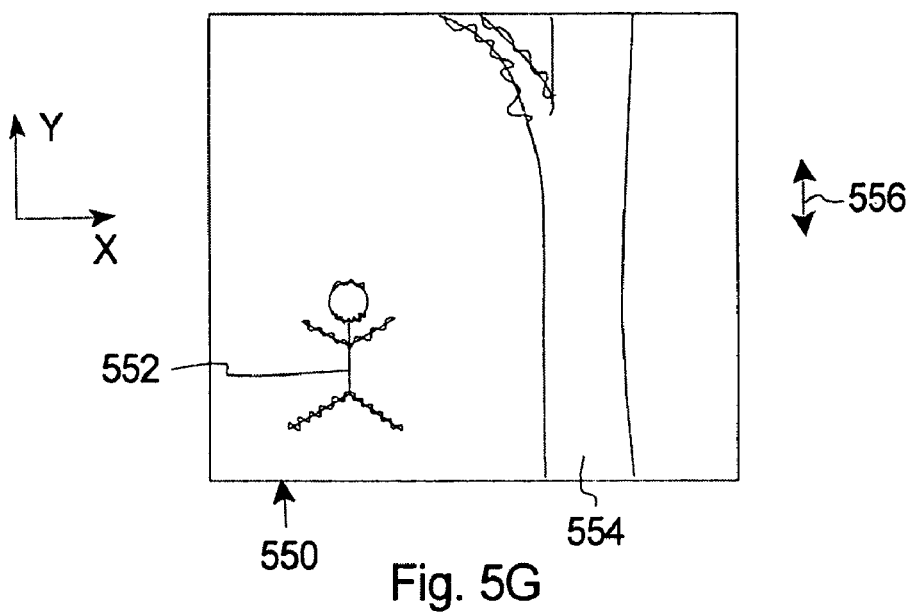
FIG. 5G is a simplified illustration of still another captured image.

FIG. 5G illustrates a blurred image 550 that may require slightly different processing. More specifically, FIG. 5G illustrates a person 552 and a tree 554. In this embodiment, a portion of the person 552 and a portion of the tree 554 are blurred (illustrated with wavy lines to depict blur) because the camera (not shown in FIG. 5G) was moved up and down vertically (illustrated with arrow 556 that represents the motion direction of the camera) while the image 550 was captured. In this embodiment, the portion of the tree 554 and the portion of the person 552 that are parallel with the motion direction 556 of the camera are sharp. As a result thereof, the methods described above may lead to a classification that the image 550 is sharp. However, the blur of the person 552 makes this image 550 not satisfactory.

Thus, in some embodiments, it can be desirable to test for motion blur of the image 550 prior to measuring the blur metric as described above.

Typically, in an image 550 with camera motion blur, the edges of the objects (e.g. the person 552 and the tree 554) along the motion direction 556 remain sharp. Thus, an image with large motion blur will likely have a dominant gradient direction related to the motion blur direction. In one embodiment, the method provided herein checks to determine whether there exists a dominant gradient direction. For example, image gradient directions can be analyzed to check if there exists a dominant gradient direction. If a dominant gradient direction exists, the method needs to confirm that it is true motion blur, and not sharp images having a dominant edge orientation. Typically, sharp images most likely contain other sharp structures than along detected possible motion direction. Stated in another fashion, sharp images typically contain sharp structures that are different than detected possible motion direction. In contrast, with motion blur, the image most likely is only sharp along detected motion direction.

In certain embodiments, when evaluating gradient directions, long edge structures in the image should be identified and excluded from the computation of dominant gradient orientation. These long edges/structures are likely not caused by motion blur.

In one embodiment, the gradient directions are computed from a downsampled input image to reduce computational complexity. Long edge structures (such as the edges of the tree 554) will still remain as edge structures in a downsampled much smaller image; while short edge structures most likely will disappear in a much smaller image. In one non-exclusive embodiment, the downsampled image is approximately ⅛ of the size of the original image. In order to identify long edge structures, the edge structures in a much smaller downsampled images are computed (due to the fact the long edges will remain there, but short edges will disappear), the extracted long edge map is up sampled from low resolution to higher resolution and exclude them in the gradient direction computation.

Further, pixels with very small gradient values can be ignored when trying to determine if a dominant gradient direction exists. Thus, this evaluation will use only edge pixels having values greater than a predetermined threshold. (constrain Absolute values (Gx)+Absolute value (Gy) greater>than a predetermined threshold).

Moreover, isolated edge pixels can be ignored during testing for a dominant gradient direction because most isolated edge pixels are actually noisy pixels.

In one embodiment, the gradient directions can be separated into 10 bins from 0 to 180 with 20 degree apart. Subsequently, if the largest percentage amount (peak direction) exceeds a certain threshold, the dominanted gradient direction is selected as this peak direction. Compute the number of angles (largebin) with distribution>threshold (e.g., 10%). Large bin means the gradient direction inside counts more than certain percentage (i.e., 10%) of the total gradient direction amounts.

Determine if there exists peak gradient direction:

If (peak>threshold 1 & largebin<threshold 2)| (peak>threshold 3 & largebin<th4)

e.g. th 1=70%; th 2=5; th3=40%, th4=4.

In another embodiment, the dominant gradient direction can be estimated using a principle component analysis (PCA). A data set is formed from all the detected edge pixels, each data contains two components: x-direction gradient, y-direction gradient. Next, PCA is applied to these data sets to extract the $1^{st}$ component direction and its variance, $2^{nd}$ component direction and its variance. The ratio of the $1^{st}$ component variance to the $2^{nd}$ component variance is compared with some threshold to determine if there exists dominant gradient direction. If yes, the $1^{st}$ component direction is the corresponding gradient direction.

For an image 550 with detected possible motion blur, further verification is necessary to verify if the image is truly motion blurred or if it is a sharp image. As detailed above, a sharp image most likely contains sharp edges other than the detected motion direction; therefore it is sharp along the detected motion direction. However, a truly motion blurred image typically contains none or few large gradients along the detected motion direction, and therefore it is blurry along the detected motion direction (although it may look sharp perpendicular to the motion direction).

In one embodiment, in order to detect for possible motion blur, the sharpness degree of the image is checked along the detected motion blur direction. Stated in another fashion, first, the direction of motion is identified as provided above. In the FIG. 5G, the direction of motion is illustrated by arrow 556. Next, the image gradient histogram distribution is generated to represent how much difference in intensity exists between adjacent pixels along the possible direction of motion. In FIG. 5G, the possible motion direction is along the Y axis. This example can be represented as following equation:

$$Gy=G(i,j)-G(i,j+1)$$

where G(i,j) represents the intensity of a pixel located at i, j; and G(i, j+1) represents the intensity of a pixel located at i, j+1.

Subsequently, the image gradient histogram distribution is compared to the model gradient histogram to determine if the image is blurred or sharp.

Alternatively, if the possible motion direction is at a different angle, the intensity of the adjacent pixels along that motion direction are compared to generate the image gradient histogram distribution.

Figure 5H:
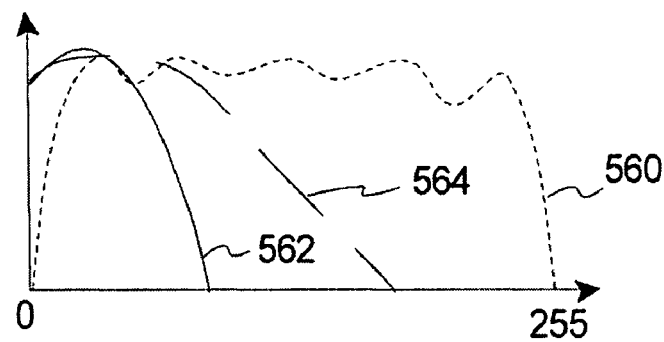
FIG. 5H is an intensity histogram that represents an image with good contrast, an image with poor contrast, and an image with adjusted contrast.

FIG. 5H is an intensity histogram that includes a line 560 (short dashes) that represents an image with good contrast, a line 562 (solid line) that represents an image with poor contrast, and a line 564 (long dashes) that represents an image with adjusted contrast. In certain situations, sharp images with low contrast can be incorrectly misclassified as blurry using one or more of the methods disclosed herein. Stated in another fashion, the image gradients are sensitive to image contrast level. Thus, a sharp block with low contrast can easily be misclassified as blurry. However, a blurry block with over-adjusted contrast can easily be misclassified as sharp.

Accordingly, in certain embodiments, the present invention tests one or more of the regions of the image to determine if the contrast of the regions is adequate, e.g. above a predetermined contrast threshold. Subsequently, if the contrast is not adequate, it can be increase/adjusted prior to performing the gradient testing methods disclosed herein.

For example, an intensity domain histogram curve of the image can be generated to determine if the contrast of the image is correct. An 8-bit greyscale image has 256 possible intensities (indexed from 0-255). The histogram curve illustrates the number of pixels in at image at each different intensity value. In FIG. 5H, line 560 illustrates the intensity domain histogram curve for an image having good contrast because there is a good distribution of the intensity values for the image. Further, in FIG. 5H, line 562 illustrates the intensity domain histogram curve for an image having poor contrast because there is a poor distribution of the intensity values for the image.

After it is determined that the image has poor contrast, the contrast can be adjusted (e.g. by linear mapping to a higher contrast) for at least a portion of the image if the contrast is determined to be below the predetermined threshold. In FIG. 5H, line 564 illustrates the adjusted intensity domain histogram curve for the poor contrast image. For example, the contrast of one or more of the regions can be linearly adjusted based on a histogram analysis of that region. In one embodiment, contrast adjustment can include finding low, high intensity value (skip 1% low and top pixels) and map them to [0 1]. For blocks with high contrast, the low can be restricted, and the high can be restricted in certain ranges to avoid over adjustment.

In certain embodiments, to avoid over adjusting the contrast, there is no contrast adjustment for regions with very dark colors, very high contrast blocks, or blocks with narrow intensity ranges.

Figure 5I:
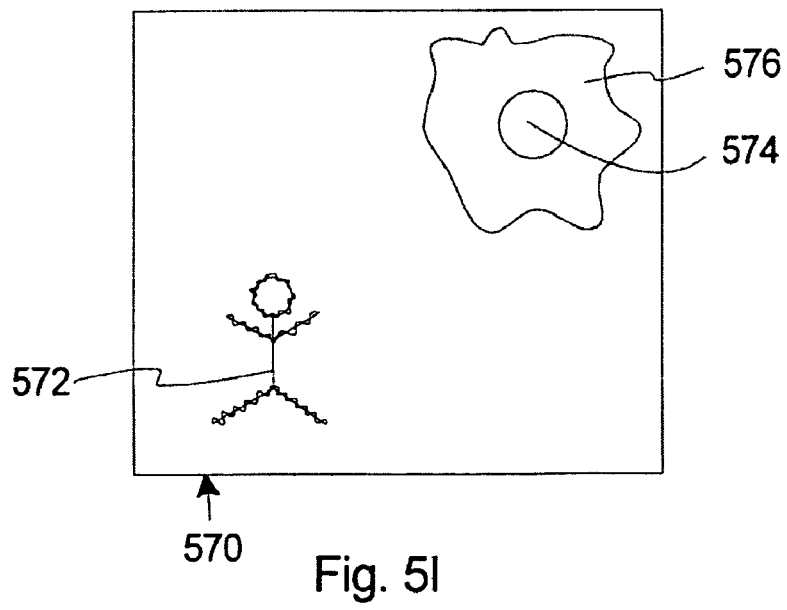
FIG. 5I is a simplified illustration of yet another captured image.

FIG. 5I is a simplified illustration of yet another captured image 570. In this embodiment, FIG. 5I illustrates a person 572 and a light 574. In this embodiment, the person 572 is blurred (illustrated with wavy lines to depict blur) as a result of motion blur. However, in this embodiment, the light 574 is saturated 576. With the saturation 576 of the light 574, the methods described above may lead to a classification that the image 570 is sharp. More specifically, the difference in intensity between the saturated light 576 and the pixels adjacent the saturated light 576 may lead to a classification that the image 570 is sharp. However, the blur of the person 572 and the saturated light 574 makes this image 570 not satisfactory.

Thus, in certain instances, motion blurred images with saturated lights can be easily misclassified as a sharp image. As a result thereof, in certain embodiments, the present invention detects saturated pixels and excludes them from the gradient distribution computation. For example, saturated seed pixels are selected by simply threshold method—followed by region growing around the seeds. More specifically, pixels having an intensity value of greater than a certain predetermined intensity threshold (e.g. greater than 240, greater than 250 or greater than 253) can be excluded from image gradient calculations.

Figure 6:
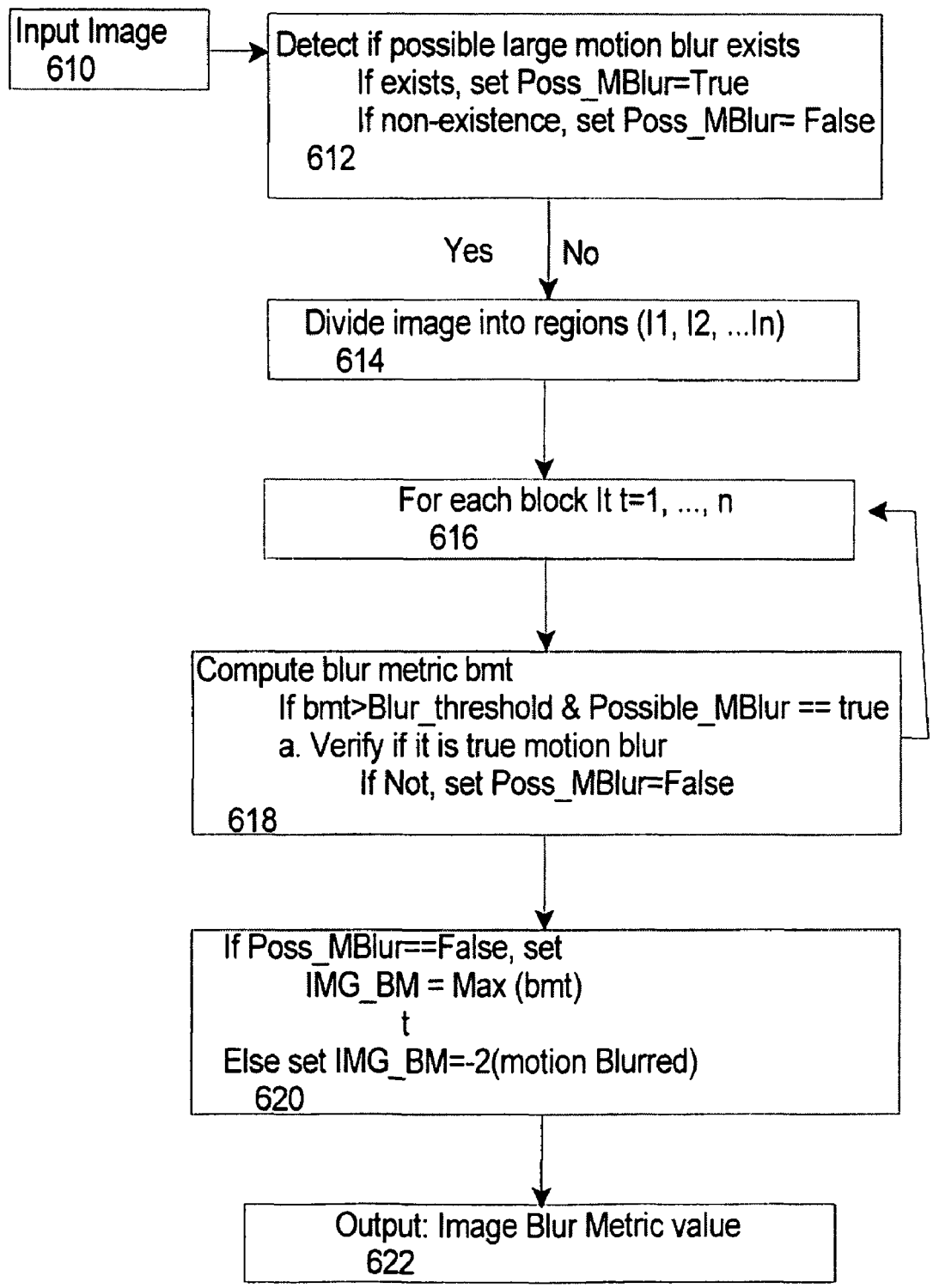
FIG. 6 is another flow chart that illustrates an image processing procedure having features of the present invention.

FIG. 6 is another flow chart that illustrates an image processing procedure having features of the present invention. In this embodiment, the image is input at step 610. Next at step 612, the image is evaluated to detect if possible large motion blur exists in the image. This can be performed using the method described above. If a large motion blur exists, set Poss_MBlur=True. Alternatively, if large motion blur is non-existant, set Poss_MBlur=False. Subsequently, the image is divided into regions (l1, l2, . . . ln) at block 614. Next, lt (image block l with index t) is calculated for each of the regions at block 616. Subsequently, the blur metric value is calculated for each region at block 618. If bmt (blur metric value for block t (bm t))>a given threshold and Poss_MBlur==true, then verify if it is true motion blur. If not set Poss_MBlur=False. If the Poss_MBlur==false, then set image blur metric=maximum bmt. Alternatively, set image blur metric equal to motion blur.

Finally, the image blur metric value is outputted at block 622.

Figure 7:
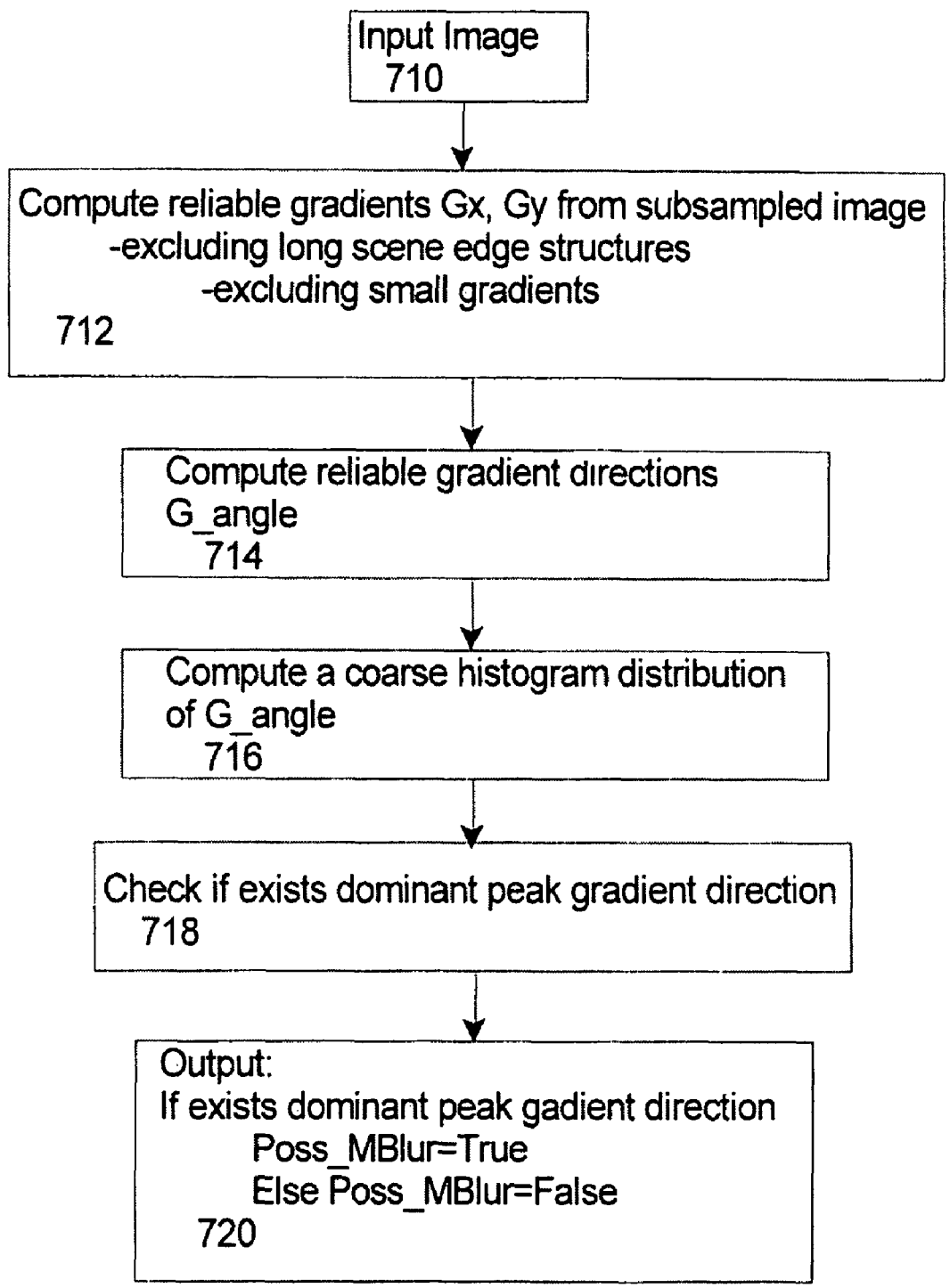
FIG. 7 is still another flow chart that illustrates an image processing procedure having features of the present invention.

FIG. 7 is still another flow chart that illustrates an image processing procedure having features of the present invention. In this embodiment, the image is input at block 710. Next at block 712, gradients are computed along the X axis and the Y axis Gx, Gy from a subsampled image (excluding long scene edge structures and small gradients). Subsequently the gradients are computed to determine the gradient angles at block 714. Next, the coarse histogram distribution of the gradient angle is calculated at step 716. Subsequently, the coarse histogram distribution of the gradient angle is reviewed to determine if a dominant peak gradient direction exists at block 718. Finally, if a dominant peak gradient exists, the possible motion blur is set to true (Poss_MBlur=True) or if no dominant peak gradient exists, the possible motion blur is set to false (Poss_MBlur=False) at block 720.

Figure 8:
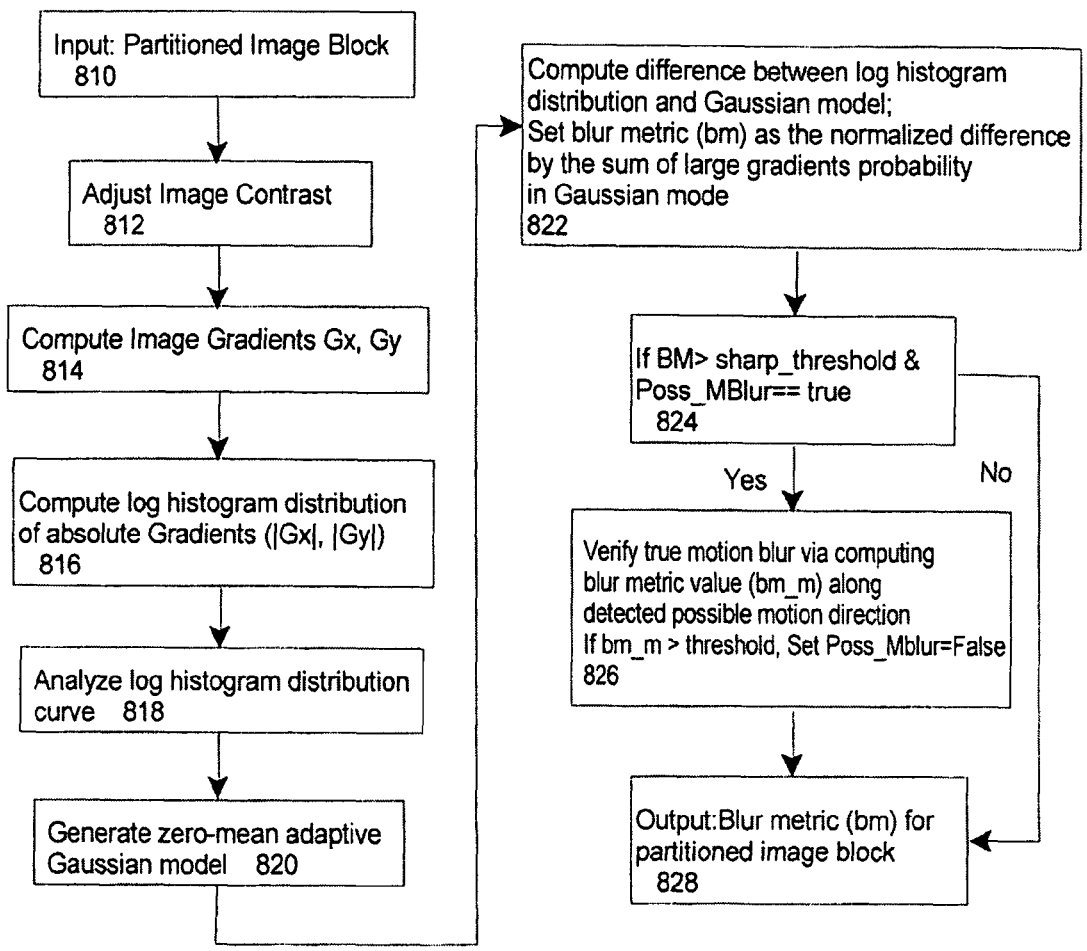
FIG. 8 is yet another flow chart that illustrates an image processing procedure having features of the present invention.

FIG. 8 is yet another flow chart that illustrates an image processing procedure having features of the present invention. At block 810 the input image is partitioned into regions. Next, the contrast of each region is evaluated and adjusted if necessary at block 812. Subsequently, image gradients Gx, Gy along the X axis and the Y axis are computed at block 814. Next, the log histogram distribution of absolute gradients are computed at block 816. Next, the log histogram distributions curve is analyzed at block 818. Subsequently, the zero-mean adaptive Gaussian model is generated at block 820.

Next, the difference between the log histogram and Gaussian model is computed, the blur metric is set as the normalized difference by the sum of large gradients probability in Gaussian mode at block 822.

Subsequently, if the blur metric is greater than a predetermined threshold and the possible motion blur is true at step 824. If yes, the true motion blur is computed. Finally, the blur metric value for the portioned image block is output at block 828. If yes, we need to further check to verify it is motion blur or sharp image with dominant edges. If no, we can output blur metric results.

Figure 9A:
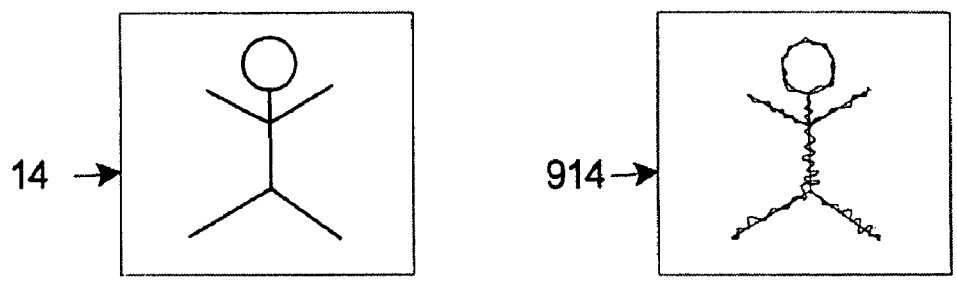
FIG. 9A is a simplified illustration of the first image and a blurred first image.
Figure 9B:
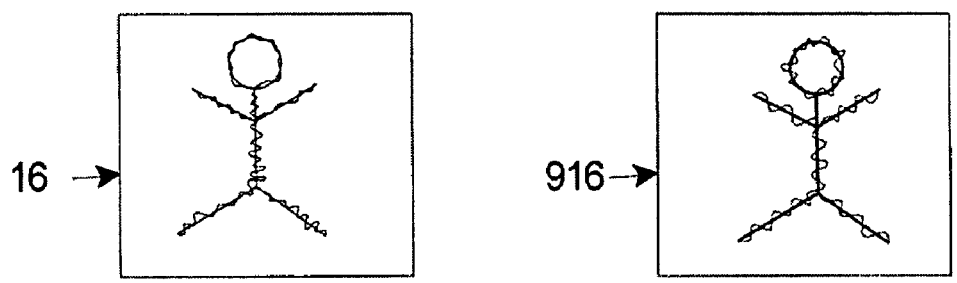
FIG. 9B is a simplified illustration of the second image and a blurred second image.

FIG. 9A is a simplified illustration of the first image 14 and a blurred first image 914, and FIG. 9B is a simplified illustration of the second image 16 and a blurred second image 916. In this embodiment, the blurred first image 914 that was generated by artificially blurring (using a low pass filter for example) the first image 14, the blurred second image 916 was generated by artificially blurring (using a low pass filter for example) the second image 16. Blurring is again represented by wavy lines. It should be noted that there is a much greater difference between the artificially blurred first image 914 and the first captured image 14, than the artificially blurred second image 916 and the second captured image 16. Stated in another fashion, the sharper the original image, the greater the difference there will be between the original image and artificially blurred original image. Further, the blurrier the original image, the smaller the difference there will be between the original image and artificially blurred original image.

Figure 9C:
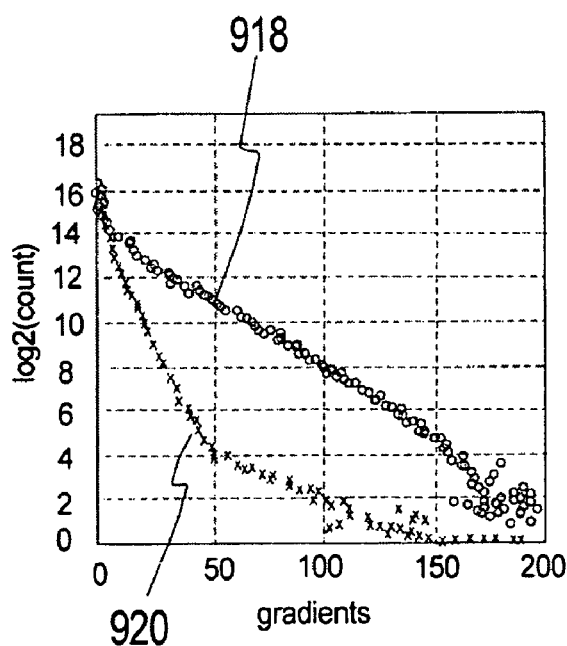
FIG. 9C is a graph that illustrates a histogram distribution of the absolute image gradient for the first image, and a histogram distribution of the absolute image gradient for a blurred first image.
Figure 9D:
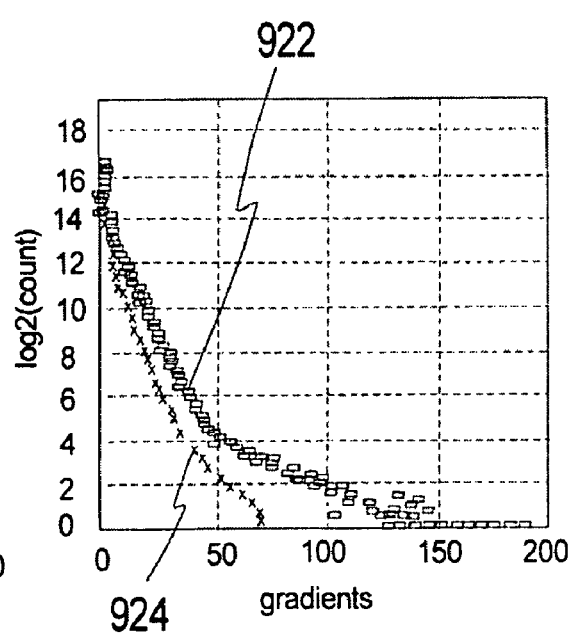
FIG. 9D is a graph that illustrates a histogram distribution of the absolute image gradient for the second image, and a histogram distribution of the absolute image gradient for a blurred second image.

FIG. 9C is a graph that illustrates a histogram distribution of the absolute image gradient 918 for the first image 14, and a histogram distribution of the absolute image gradient 920 for the blurred first image 914. Somewhat similarly, FIG. 9D is a graph that illustrates a histogram distribution of the absolute image gradient 922 for the second image 16, and a histogram distribution of the absolute image gradient 924 for the blurred second image 916.

In this embodiment, the present invention computes a distribution probability difference to estimate if the image 14, 16 is either blurred or sharp. For example, the image gradient histogram distribution 918 for the first image 14 is compared to the image gradient histogram distribution 920 for the blurred first image 914 to determine if the first image 14 is sharp or blurred. Similarly, the image gradient histogram distribution 922 for the second image 16 is compared to the image gradient histogram distribution 924 for the blurred second image 916 to determine if the second image 16 is sharp or blurred. Typically, the less the difference, the more likely the given image is blurred, while the bigger the difference, the more likely the image is sharp.

Figure 10:
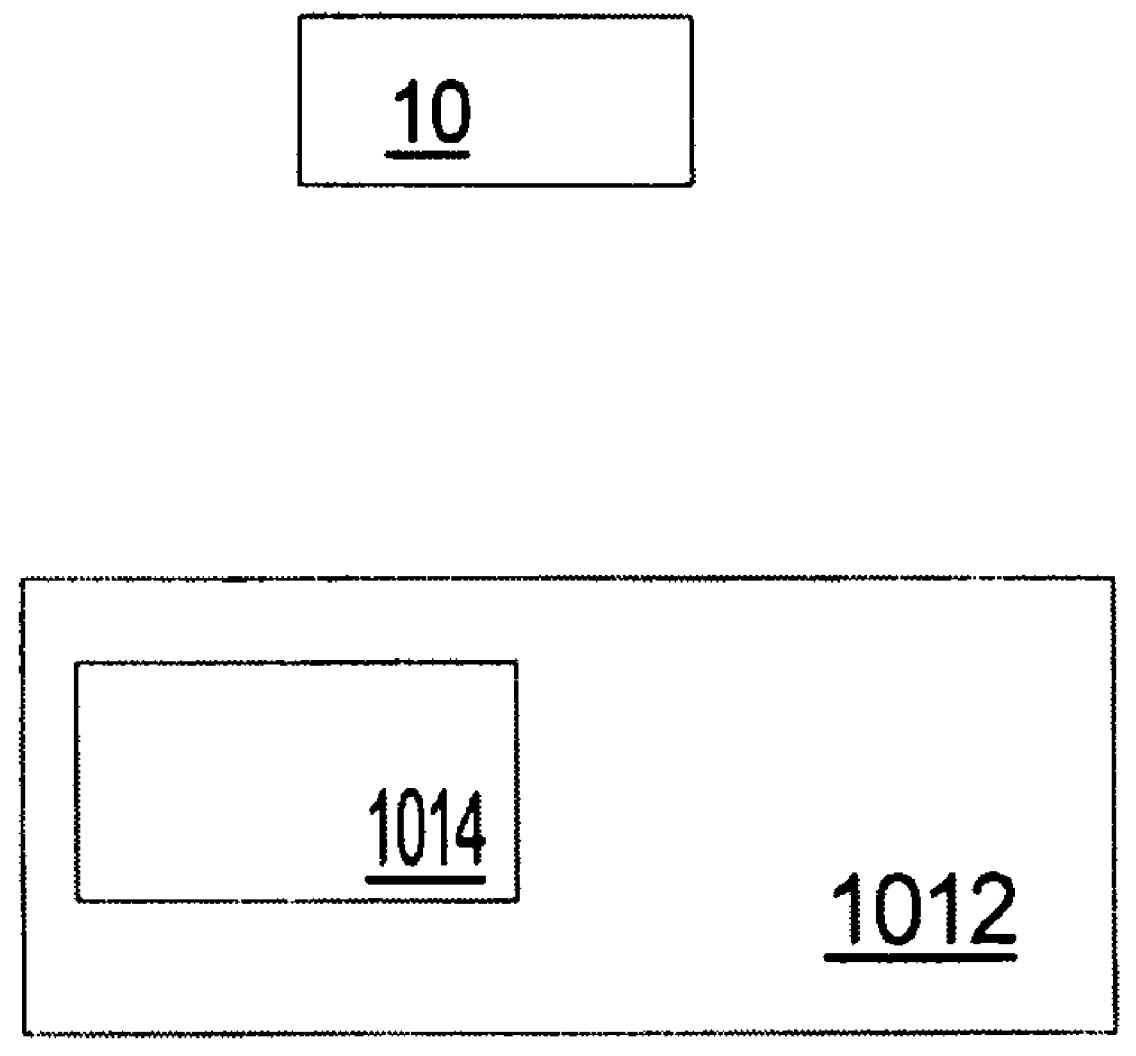

FIG. 10 illustrates another embodiment of a system that evaluates an image to determine if it is sharp or blurry. In this embodiment, the image apparatus 10 again captures an image (not shown in FIG. 10) of a scene (not shown in FIG. 10). However, in this embodiment, the image is transferred to a computer 1012 (e.g. a personal computer) that includes a computer control system 1014 (illustrated as a box) that uses one or more of the methods disclosed herein to estimate if the image is blurred or sharp. Further, the computer control system 1014 can deblur the image and provide the adjusted image (not shown in FIG. 10).

It should be noted that the methods disclosed herein can be used separately or in conjunction with other blur measuring techniques to improve the accuracy of blur detection.

Additionally, in certain embodiments, EXIF information that is attached to the image file, (e.g. F number, exposure time, focus information, and/or aperture size) can be used with the methods disclosed herein to improve the performance. For example, this information can assist in further classification of the image. For example, for a micro image, the aperture size is large and the object distance is small because the image is generally pretty close. In this example, only the small image is in focus and the rest can be blurred.

Further, the information regarding the aperture size and exposure time and image capture time can be used to identify if the image was captured at night. Subsequently, that information can be used to exclude pixels for saturated light situations.

Stated in another fashion, the following EXIF information can be potentially useful: Aperture size, F-number, Exposure time, ISO, Flash fired or not, EV, handholdable factor, object-distance, Tripod mode or not? Lens VR on/off, image capture time, etc. For example, the EXIF information can be combined with the methods disclosed herein in a probability framework to improve the classification performance.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. A method for estimating if an image is blurred or sharp, the method comprising the steps of:
   determining an image gradient histogram distribution of at least a portion of the image; and
   comparing at least a portion of the image gradient histogram distribution to a Gaussian model of at least a portion of the image to estimate if the image is either blurred or sharp.

2. The method of claim 1 wherein the step of determining includes the steps of dividing the image into a plurality of image regions and determining an image gradient histogram distribution of at least one of the image regions, and wherein the step of comparing includes the step of comparing the image gradient histogram distributions for at least one of the image regions to a Gaussian model for that image region to estimate if the image is either blurred or sharp.

3. The method of claim 2 wherein the step of comparing includes the step of comparing a tail section of the Gaussian model to a tail section of the image gradient histogram distribution.

4. The method of claim 1 wherein the step of determining includes the steps of dividing the image into a plurality of image regions and determining an image gradient histogram distribution for each of the image regions, and wherein the step of comparing includes the step of comparing the image gradient histogram distributions for each of the image regions to its respective Gaussian model to estimate if the image is either blurred or sharp.

5. The method of claim 4 wherein the step of comparing includes the step of comparing a tail section of the Gaussian model to a tail section of the image gradient histogram distribution for each image region.

6. The method of claim 1 further comprising the step of evaluating the image to estimate if there is a possible motion blur direction, and wherein the step of determining an image gradient histogram distribution of at least a portion of the image includes comparing pixels along the possible motion blur direction.

7. The method of claim 1 further comprising the step of evaluating at least a portion of the image to determine if the contrast is above a predetermined contrast threshold.

8. The method of claim 7 further comprising the step of adjusting the contrast for at least a portion of the image if the contrast is determined to be below the predetermined contrast threshold.

9. The method of claim 1 wherein the step of determining an image gradient histogram distribution of at least a portion of the image includes the step of excluding pixels having an intensity above a predetermined intensity threshold.

10. A method for estimating if an image is blurred or sharp, the method comprising the steps of:
blurring the image to create an artificially blurred image;
determining an image gradient histogram distribution for at least a portion of the image;
determining an image gradient histogram distribution for at least a portion of the artificially blurred image; and
comparing at least a portion of the image gradient histogram distribution of the image to at least a portion of the image gradient histogram distribution for the artificially blurred image to compute a distribution probability difference to estimate if the image is either blurred or sharp.

11. A device for estimating if an image is either blurred or sharp, the device comprising:
a control system including a processor that (i) determines an image gradient histogram distribution of at least a portion of the image; and (ii) compares at least a portion of the image gradient histogram distribution to a Gaussian model of at least a portion of the image to estimate if the image is either blurred or sharp.

12. The device of claim 11 wherein the control system divides the image into a plurality of image regions and determines an image gradient histogram distribution of at least one of the image regions, and wherein the control system compares the image gradient histogram distributions for at least one of the image regions to a Gaussian model for that image region to estimate if the image is either blurred or sharp.

13. The device of claim 12 wherein the control system compares a tail section of the Gaussian model to a tail section of the image gradient histogram distribution.

14. The device claim 11 wherein the control system divides the image into a plurality of image regions and determines an image gradient histogram distribution for each of the image regions, and wherein the control system compares the image gradient histogram distributions for each of the image regions to its respective Gaussian model to estimate if the image is either blurred or sharp.

15. The device of claim 14 wherein the control system compares a tail section of the Gaussian model to a tail section of the image gradient histogram distribution for each image region.

16. The device of claim 11 wherein the control system evaluates the image to estimate if there is a possible motion blur direction, and wherein the control system compares pixels along the possible motion blur direction to determine the image gradient histogram distribution.

17. The device of claim 11 wherein the control system evaluates at least a portion of the image to determine if the contrast is above a predetermined contrast threshold.

18. The device of claim 17 wherein the control system adjusts the contrast for at least a portion of the image if the contrast is determined to be below the contrast predetermined threshold.

19. The device of claim 11 wherein the control system deconvolutes the blurred image to provide an adjusted image.

20. A method for estimating a blur degree of an image, the image having a Gaussian model, the method comprising the steps of:
determining an image gradient histogram distribution of at least a portion of the image; and
comparing at least a portion of the image gradient histogram distribution to at least a portion of the Gaussian model to estimate the blur degree of the image.

21. The method of claim 20 wherein the step of determining includes the steps of dividing the image into a plurality of image regions and determining an image gradient histogram distribution of at least one of the image regions, and wherein the step of comparing includes the step of comparing the image gradient histogram distributions for at least one of the image regions to a Gaussian model for that image region.

22. The method of claim 20 wherein the step of comparing includes the step of comparing a tail section of the Gaussian model to a tail section of the image gradient histogram distribution.

23. The method of claim 20 wherein the step of determining includes the steps of dividing the image into a plurality of image regions and determining an image gradient histogram distribution for each of the image regions, and wherein the step of comparing includes the step of comparing the image gradient histogram distributions for each of the image regions to its respective Gaussian model.

24. The method of claim 23 wherein the step of comparing includes the step of comparing a tail section of the Gaussian model to a tail section of the image gradient histogram distribution for each image region.

25. The method of claim 20 further comprising the step of evaluating the image to estimate if there is a possible motion blur direction, and wherein the step of determining an image gradient histogram distribution of at least a portion of the image includes comparing pixels along the possible motion blur direction.

26. The method of claim 20 further comprising the step of evaluating at least a portion of the image to determine if the contrast is above a predetermined contrast threshold.

27. The method of claim 26 further comprising the step of adjusting the contrast for at least a portion of the image if the contrast is determined to be below the predetermined contrast threshold.

28. The method of claim 20 further comprising the step of determining an image gradient histogram distribution of at least a portion of the image includes the step of excluding pixels having an intensity above a predetermined intensity threshold.

* * * * *